(12) United States Patent
Heap et al.

(10) Patent No.: US 8,696,514 B1
(45) Date of Patent: Apr. 15, 2014

(54) METHOD AND APPARATUS FOR CONTROLLING ENGINE OPERATION IN A MULTI-MODE POWERTRAIN SYSTEM

(71) Applicant: GM Global Technology Operations LLC, Detroit, MI (US)

(72) Inventors: Anthony H. Heap, Ann Arbor, MI (US); Sean W. McGrogan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/681,466

(22) Filed: Nov. 20, 2012

(51) Int. Cl.
*B60K 1/02* (2006.01)

(52) U.S. Cl.
USPC .......................................................... 477/3

(58) Field of Classification Search
USPC .......................................................... 477/3
See application file for complete search history.

(56) References Cited

U.S. PATENT DOCUMENTS 8,562,483 B2 * 10/2013 Yang et al. ......................... 477/4

* cited by examiner

*Primary Examiner* — Dirk Wright

(57) ABSTRACT

A powertrain system includes a multi-mode transmission configured to transfer torque among an engine, torque machines, and an output member in one of a plurality of transmission ranges. A method for operating the powertrain system includes, in response to a command to disable one of the torque machines, converging minimum and maximum torque capacities of the one of the torque machines to zero and converging minimum and maximum engine torque system constraints to a single engine torque command in response to the minimum and maximum torque capacity limits of the one of the torque machines and an output torque request. Torque output from the engine is controlled including employing a fast engine actuator to control the engine in response to the output torque request, and maintaining torque output from the one of the torque machines at zero.

16 Claims, 3 Drawing Sheets

METHOD AND APPARATUS FOR CONTROLLING ENGINE OPERATION IN A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque actuators through a torque transmission device to an output member that can be coupled to a driveline. Such powertrain systems include hybrid powertrain systems and extended-range electric vehicle systems. Control systems for operating such powertrain systems operate the torque actuators and apply torque transfer elements in the transmission to transfer torque in response to operator-commanded output torque requests, taking into account fuel economy, emissions, driveability, and other factors. Exemplary torque actuators include internal combustion engines and non-combustion torque machines. The non-combustion torque machines may include electric machines that are operative as motors or generators to generate a torque input to the transmission in conjunction with or independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating range and gear shifting, controlling the torque actuators, and regulating the electrical power interchange among the electrical energy storage device and the torque actuators to manage outputs of the transmission, including torque and rotational speed.

Known multi-mode electrically-variable transmissions (EVTs) can be configured to operate in one or more fixed-gear ranges, one or more electric vehicle (EV) ranges, one or more electrically-variable transmission (EVT) ranges, and one or more neutral ranges. A zero torque output from one of the torque machines may be desirable while operating in one of the transmission ranges due to a commanded neutral condition, in response to a derated torque output of the torque machine, and in response to a fault associated with operation of the torque machine.

SUMMARY

A powertrain system includes a multi-mode transmission configured to transfer torque among an engine, torque machines, and an output member in one of a plurality of transmission ranges. A method for operating the powertrain system includes, in response to a command to disable one of the torque machines, converging minimum and maximum torque capacities of the one of the torque machines to zero and converging minimum and maximum engine torque system constraints to a single engine torque command in response to the minimum and maximum torque capacity limits of the one of the torque machines and an output torque request. Torque output from the engine is controlled including employing a fast engine actuator to control the engine in response to the output torque request, and maintaining torque output from the one of the torque machines at zero.

BRIEF DESCRIPTION OF THE DRAWINGS

One or more embodiments will now be described, by way of example, with reference to the accompanying drawings, in which.

DETAILED DESCRIPTION

Figure 1:
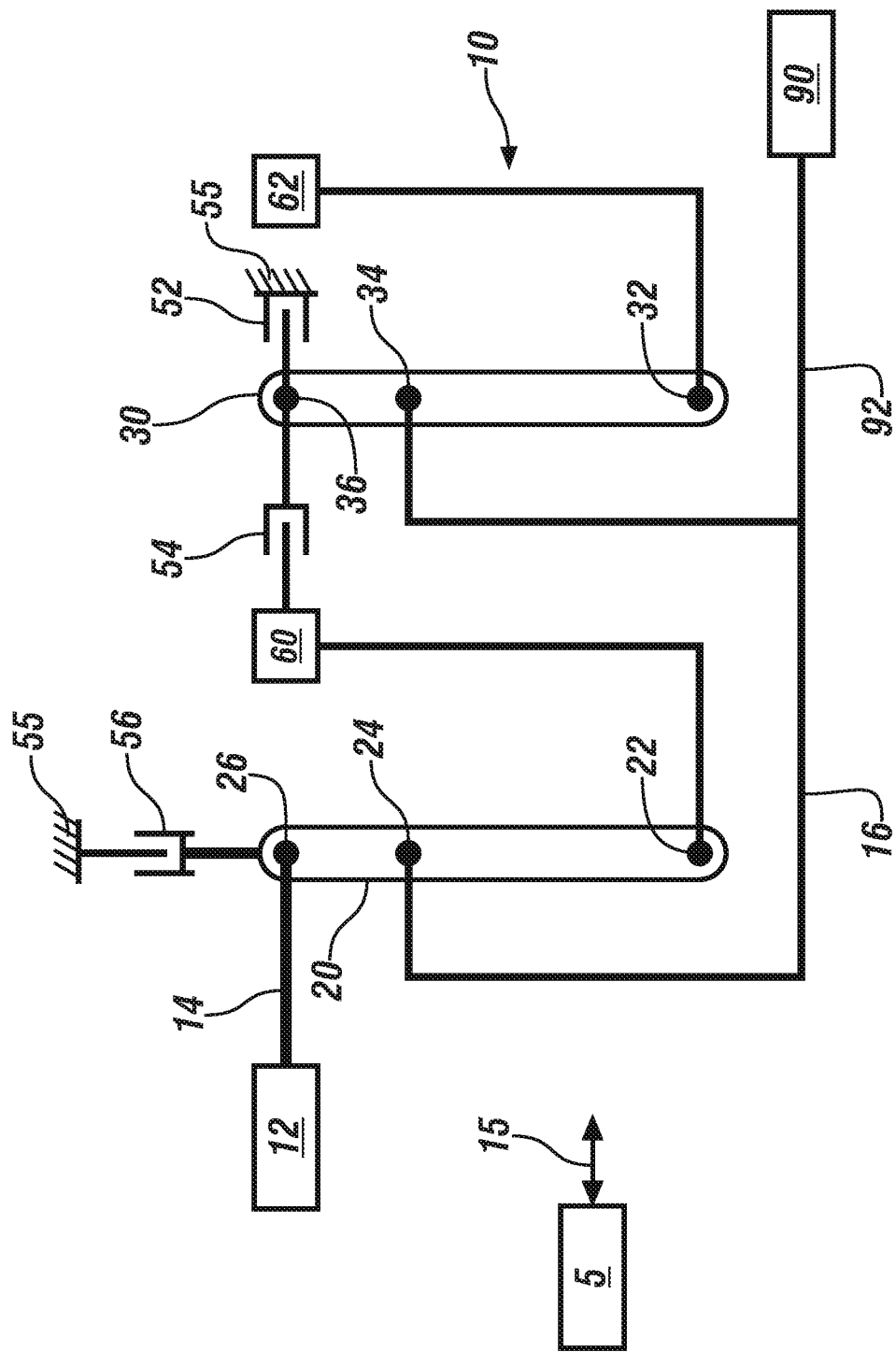
FIG. 1 schematically shows an embodiment of a multi-mode powertrain system including an internal combustion engine and a multi-mode transmission in accordance with the disclosure.

Referring now to the drawings, wherein the showings are for the purpose of illustrating certain exemplary embodiments only and not for the purpose of limiting the same, FIG. 1 depicts a non-limiting multi-mode powertrain system including an internal combustion engine (engine) 12, a multi-mode transmission (transmission) 10, and a controller 5. The transmission 10 mechanically couples to torque actuators including the engine 12 and first and second torque machines 60 and 62, respectively, and is configured to transfer torque among the engine 12, the first and second torque machines 60, 62, and a driveline 90. The first and second torque machines 60, 62 are preferably electric motor/generators. The driveline 90 can include a differential system that facilitates a rear-wheel drive vehicle configuration or a transaxle system that facilitates a front-wheel drive vehicle configuration.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 preferably includes a crankshaft coupled to the input member 14 of the transmission 10. Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. The controller 5 is configured to control actuators of the engine 12 to control combustion parameters including intake mass airflow, spark-ignition timing, injected fuel mass, fuel injection timing, EGR valve position to control flow of recirculated exhaust gases, and intake and/or exhaust valve timing and phasing on engines so equipped. The engine 12 employs fast engine actuators, e.g., spark timing control or fuel injection timing control, and slow engine actuators, e.g., throttle/mass air control or fuel mass control, to control engine torque output. Hence, engine speed and torque can be controlled by controlling combustion parameters including airflow torque and spark induced torque. Engine speed may also be controlled by controlling reaction torque at the input member 14 through control of motor torques of first and second torque machines 60, 62.

The illustrated transmission 10 is a two-mode, compound-split, electro-mechanical transmission 10 that includes two planetary-gear sets 20 and 30, and three engageable torque-transferring devices, i.e., clutches C1 52, C2 54, and C3 56. The two modes of operation refer to power-split modes of operation including an input-split mode and a compound-split mode as described herein. Other embodiments of the transmission are contemplated, including those having three or more power-split modes of operation. The planetary gear set 20 includes a sun gear member 22, a ring gear member 26, and planet gears 24 coupled to a carrier member. The carrier member rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member. The planet gears 34 are disposed in meshing relationship with both the sun gear member 32 and the ring gear member 36, and the carrier member couples to the rotatable shaft member 16.

As used herein, clutches refer to torque transfer devices that can be selectively applied in response to a control signal. Each of the clutches may be any suitable torque transfer device including by way of example a single or compound plate clutch or pack, a one-way clutch, a band clutch, or brake. In one embodiment, one or more of the clutches may include one-way clutch devices or selectable one-way clutch devices. A control circuit is configured to control clutch states of each of the clutches, including activating and deactivating each of the clutches. In one embodiment, the control circuit is a hydraulic circuit configured to control clutch states of each of the clutches, with pressurized hydraulic fluid supplied by a hydraulic pump that can be operatively controlled by the controller 5. Clutch C2 54 is a rotating clutch. Clutches C1 52 and C3 56 are brake devices that can be grounded to a transmission case 55.

A high-voltage electrical system includes an electrical energy storage device, e.g., a high-voltage battery (battery) electrically coupled to an inverter module via a high-voltage electrical bus, and is configured with suitable devices for monitoring electric power flow including devices and systems for monitoring electric current and voltage. The battery can be any suitable high-voltage electrical energy storage device, e.g., a high-voltage battery, and preferably includes a monitoring system that measures electrical power supplied to the high-voltage electrical bus, including voltage and electric current.

The first and second torque machines 60, 62 are three-phase AC motor/generator machines in one embodiment with each including a stator, a rotor, and a rotational speed sensor, e.g., a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches a rotating member that couples to the sun gear 22 of the first planetary gear set 20. The rotor for the second torque machine 62 is fixedly attached to a rotating member that couples to the sun gear 32 of the second planetary gear set 30.

The output member 92 of the transmission 10 rotatably connects to the driveline 90 to provide output power to the driveline 90 that is transferred to one or a plurality of vehicle wheels via differential gearing, a transaxle, or another suitable device. The output power at the output member 92 is characterized in terms of an output rotational speed and an output torque.

The input torque from the engine 12 and the motor torques from the first and second torque machines 60, 62 are generated as a result of energy conversion from fuel or electrical potential stored in the electrical energy storage device (battery). The battery is high voltage DC-coupled to the inverter module via the high-voltage electrical bus. The inverter module preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors (IGBTs) for converting DC power from the battery to AC power for powering respective ones of the first and second torque machines 60 and 62, by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors and transform it to or from three-phase AC power, which is conducted to or from the first and second torque machines 60 and 62 for operation as motors or generators via transfer conductors. The inverter module transfers electrical power to and from the first and second torque machines 60 and 62 through the power inverters and respective motor control modules in response to the motor torque commands. Electrical current is transmitted across the high-voltage electrical bus to and from the battery to charge and discharge the high-voltage battery.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including cells of the high-voltage battery and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the inverter module. A user interface is preferably signally connected to a plurality of devices through which a vehicle operator directs and commands operation of the powertrain system, including commanding an output torque request and selecting a transmission range. The devices preferably include an accelerator pedal, an operator brake pedal, a transmission range selector (PRNDL), and a vehicle speed cruise control system. The transmission range selector may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The operator-selectable positions of the transmission range selector can correspond directly to individual transmission ranges described with reference to Table 1, or may correspond to subsets of the transmission ranges described with reference to Table 1. The user interface may include a single device, as shown, or alternatively may include a plurality of user interface devices directly connected to individual control modules.

The aforementioned control modules communicate with other control modules, sensors, and actuators via the communications link 15, which effects structured communication between the various control modules. The communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, and may include direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals referred to as loop cycles, for example each 3.125, 6.25, 12.5, 25 and 100 milliseconds during ongoing engine and vehicle operation. Alternatively, routines may be executed in response to occurrence of an event.

The multi-mode powertrain is configured to operate in one of a plurality of powertrain states, including a plurality of transmission ranges and engine states to generate and transfer torque to the driveline 90. The engine states include an ON state, an OFF state, and a fuel cutoff (FCO) state. When the engine operates in the OFF state, it is unfueled, not firing, and is not spinning. When the engine operates in the ON state it is fueled, firing, and spinning. When the engine operates in the FCO state, it is spinning but is unfueled and not firing. The engine ON state may further include an all-cylinder state (ALL) wherein all cylinders are fueled and firing, and a cylinder-deactivation state (DEAC) wherein a portion of the cylinders are fueled and firing and the remaining cylinders are unfueled and not firing. The transmission ranges include a plurality of neutral (Neutral), fixed gear (Gear #), electric vehicle (EV#), and electrically-variable mode (EVT Mode #) ranges that are achieved by selectively activating the clutches C1 52, C2 54, and C3 56. The Neutral range includes an electric torque converter (ETC) range, during which electric power can flow to or from the battery in relation to the output torque, the engine speed, the output speed, and speed of one of the torque machines, albeit with zero tractive torque output from the torque machines. Other powertrain states, e.g., transitional ranges may be employed. Table 1 depicts a plurality of the powertrain states including transmission ranges and engine states for operating the multi-mode powertrain.

TABLE 1

| Range | Engine State | C1 | C2 | C3 |
|---|---|---|---|---|
| Neutral 1/ETC | ON(ALL/DEAC/FCO)/OFF | | | |
| EVT Mode 1 | ON(ALL/DEAC/FCO) | X | | |
| EVT Mode 2 | ON(ALL/DEAC/FCO) | | X | |
| Fixed Gear 1 | ON(ALL/DEAC/FCO) | X | X | |
| 2 Motor EV | OFF | X | | X |
| Motor A EV | OFF | | | X |
| Motor B EV | OFF | X | | |

The powertrain configuration permits two power split modes of operation when the engine is on, including the input-split mode, e.g., EVT1 and the compound-split mode, e.g., EVT2. The configurations allow the second torque machine 62 to be disconnected from the transmission output member 92 without disrupting the flow of power from the engine 12 and first torque machine 60.

When operating in Fixed Gear 1 range, the powertrain system has a single degree of freedom (1-dF) with regard to speed. Thus, there is a single independent speed node, and all other speed nodes are linearly dependent thereon. For example, all speed nodes including the input speed (Ni) are proportional to output speed (No). Exemplary governing equations include as follows.

$$[To] = [A1 \quad A2 \quad A3] * \begin{bmatrix} Ta \\ Tb \\ Ti \end{bmatrix} \quad [1]$$

and $$\begin{bmatrix} Na \\ Nb \\ Ni \end{bmatrix} = [B1 \quad B2 \quad B3] * [No] \quad [2]$$

wherein Ta represents torque output of the first torque machine 60,

Tb represent the torque output of the second torque machine 62,

Ti represents the input torque at member 14, i.e., from the engine 12,

To represents the output torque at member 92,

Na represents the speed of the first torque machine 60,

Nb represents the speed of the second torque machine 62,

Ni represents the input speed at member 14,

No represents the output speed at member 92, and

A1, A2, A3, B1, B2, and B3 are application-specific scalar values determined based upon gearing relationships.

When operating in one of the EV or EVT ranges, the powertrain system has two degrees of freedom (2-dF) with regard to speed, thus allowing two independent speed nodes. For example, all speed nodes other than the input and output speeds can be calculated as a linear combination of the input and output speeds. Exemplary governing equations include as follows.

$$\begin{bmatrix} Ta \\ Tb \end{bmatrix} = \begin{bmatrix} A11 & A12 \\ A21 & A22 \end{bmatrix} * \begin{bmatrix} Ti \\ To \end{bmatrix} \quad [3]$$

and $$\begin{bmatrix} Na \\ Nb \end{bmatrix} = \begin{bmatrix} B11 & B12 \\ B21 & B22 \end{bmatrix} * \begin{bmatrix} Ni \\ No \end{bmatrix} \quad [4]$$

wherein A11, A12, A21, A22, B11, B12, B21, and B22 are application specific scalar values determined based upon gearing relationships.

When operating in the Neutral 1/ETC range, the powertrain system has three degrees of freedom (3-dF) with regard to speed including the input speed, output speed and one other speed. In this range, there may not be the flexibility to choose motor torques such that battery power is zero for any given engine torque. When no clutches are applied, the transmission is in the Neutral 1/ETC range. In this transmission range, the second torque machine 62 is decoupled from the transmission, so its speed may be independently controlled. The motor torque output Ta of the first torque machine 60 is proportional to the output torque To and its speed is a linear combination of the input and output speeds. Exemplary governing equations include the following.

$$\begin{bmatrix} Ti \\ Ta \\ Tb \end{bmatrix} = [A1 \quad A2 \quad A3] * [To] \quad [5]$$

and $$[No] = [B1 \quad B2 \quad B3] * \begin{bmatrix} Ni \\ Na \\ Nb \end{bmatrix} \quad [6]$$

wherein A1, A2, A3, B1, B2, and B3 are application-specific scalar values determined based upon gearing relationships.

Figure 2:
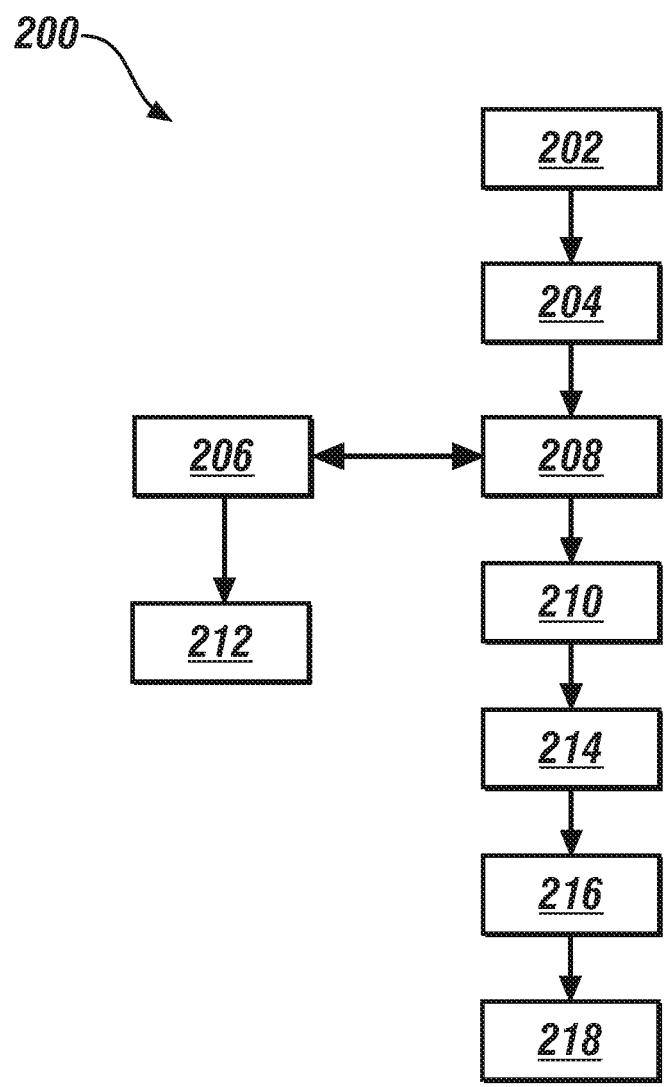
FIG. 2 schematically shows an embodiment of a control scheme employed to control an embodiment of the powertrain system described with reference to FIG. 1 to disable one of the torque machines, thus generating zero torque therefrom in accordance with the disclosure.

FIG. 2 illustrates a control scheme 200 that is employed to control an embodiment of the powertrain system described with reference to FIG. 1 to disable one or more of the torque machines (referred to herein as motor X), thus generating a torque output of zero torque or a derated torque output therefrom. This includes controlling the powertrain system while transitioning to the disabled motor state or derated motor state for motor X. This can include operating in the Neutral 1/ETC range described with reference to Table 1 and EQS. 5 and 6. Table 2 is provided as a key wherein the numerically labeled blocks and the corresponding functions are set forth as follows.

TABLE 2

| BLOCK | BLOCK CONTENTS |
|---|---|
| 202 | Command disablement of motor X |
| 204 | Converge minimum and maximum torque capacity limits of motor X over time |
| 206 | Permit engine control to change from inactive to active |
| 208 | Converge minimum and maximum engine torques to a single engine torque command responsive to minimum and maximum torque capacity limits of motor X and output torque request |
| 210 | Control operation of powertrain system in disabled motor state |
| 212 | Control engine in active response state responsive to output torque request |
| 214 | Command exit from disabled motor state |
| 216 | Increase magnitudes of minimum and maximum torque |

TABLE 2-continued

| BLOCK | BLOCK CONTENTS |
|---|---|
|  | capacity limits of motor X over time; Control motor X torque responsive to output torque request |
| 218 | Increase magnitude of minimum and maximum engine torques; Control engine torque responsive to output torque request and motor X torque within minimum and maximum engine torques |
| 220 | Command engine state to inactive response state |

Figure 3:
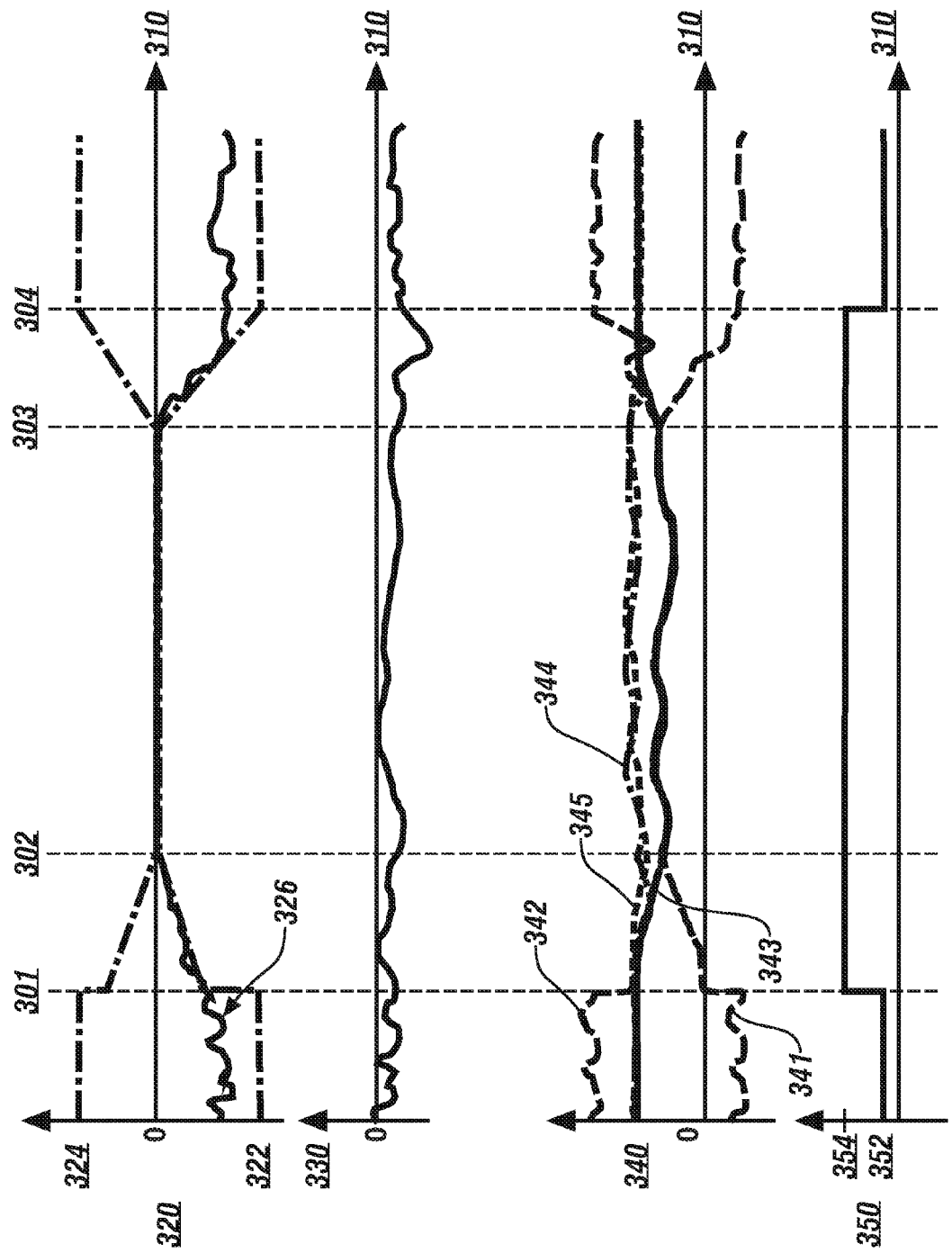
FIG. 3 graphically shows operating parameters associated with an embodiment of the powertrain system described with reference to FIG. 1 executing an embodiment of the control scheme described with reference to FIG. 2 in accordance with the disclosure.

Data associated with execution of an embodiment of the control scheme 200 on an exemplary embodiment of the powertrain system is shown with reference to FIG. 3. During ongoing powertrain operation, there can be a command to disable or derate motor X, i.e., to operate with one of the torque machines disabled or derated and thus generating zero tractive torque or a derated torque output (202). The command to disable motor X may be part of a command to operate in the Neutral 1/ETC range. The command to disable motor X may include a command to reduce torque output of the torque machine in response to the derated torque output of the torque machine, as may occur due to overheating in the torque machine or a fault in the control system for the torque machine. A command to reduce torque output of the torque machine in response to a derated torque output can result in a derated but non-zero torque output from the torque machine.

Minimum and maximum torque capacity limits of motor X are converged to zero or the derated torque output over a brief time period (204), which permits commanding the engine control to change from an inactive state to an active state (206) and converging minimum and maximum engine torques to a single engine torque command responsive to the minimum and maximum torque capacity limits of motor X and the output torque request (208). Converging minimum and maximum engine torques is preferably accomplished by ramping, i.e., time-rate changing the minimum and maximum engine torques to the single, common engine torque command based upon the motor torque constraints, thus allowing engine operation to control the input torque and thus control the input speed. When the aforementioned commands are completely executed, operation of the powertrain system is controlled in the disabled motor state with the motor X torque command set equal to zero or the derated torque command (210). When the command to disable motor X includes a command to reduce torque output of the torque machine in response to the derated torque capacity of the torque machine, the minimum and maximum torque capacities of the one of the torque machines converge to the derated torque capacity of the torque machine, which may include ramping down to zero torque output or the derated torque output.

Operation in the disabled motor state with the motor X torque command set equal to zero or at a derated torque capacity includes permitting controlling the engine in the active response state responsive to the output torque request. This includes controlling the engine responsive to an immediate engine torque command that is less than a predicted engine torque command and thus at a spark advance that differs from MBT-spark advance when the engine is configured as a spark-ignition internal combustion engine. This includes controlling the engine responsive to an immediate engine torque command that is less than a predicted engine torque command and thus at a fuel injection timing that differs from an optimal fuel injection timing when the engine is configured as a compression-ignition internal combustion engine. The fast engine actuators can be employed to readily change the engine torque, thus providing a fast-responding engine reserve to either increase engine torque output or decrease engine torque output (212). The engine operation includes controlling the slow engine actuators and the fast engine actuators such that the engine torque can be readily increased by adjusting spark advance towards MBT-spark advance or readily decreased by adjusting spark advance further away from MBT-spark advance. In this manner, the engine employs torque control, with torque output of the engine controlled responsive to the output torque request. Torque output from motor X is maintained at zero (or its derated torque level), thus there is zero (or derated) tractive torque generated by motor X. When the engine is operating as described, it is capable of rapidly increasing or rapidly decreasing engine torque using the fast engine actuator(s) in response to the output torque request, taking into account other engine and powertrain operating factors. The engine control may change between the active state and the inactive state multiple times during operation in the disabled motor state, depending upon operating conditions.

Operation in the disabled motor state may subsequently be discontinued (214), which includes increasing the magnitudes of the minimum and maximum torque capacity limits of motor X over time, i.e., ramping up, and correspondingly controlling the motor X torque responsive to the output torque request (216). In response, the magnitudes of the minimum and maximum engine torques increase and engine torque is controlled responsive to the output torque request and the motor X torque within the limits set by the minimum and maximum engine torques (218). When these transitions are completed, the engine control can be commanded to change from the active state to the inactive state (220), and the powertrain system is controlled responsive to the output torque request.

FIG. 3 graphically shows a plurality of time-coincident parameters associated with transitioning to and controlling a powertrain system in a transmission state wherein one of the torque machines (motor X) is disabled. By way of example, one of the torque machines is disabled when operating the powertrain system in an electric-neutral state, e.g., when the powertrain system described with reference to FIG. 1 is operating in the Neutral 1/ETC state. The parameters include motor X torque 320 for one of the torque machines, e.g., the second torque machine 62, including minimum and maximum motor X torque capacities 322 and 324, respectively, and motor X torque command 326, and motor X speed control torque correction request 330. The parameters include engine torques 340 including minimum and maximum engine torque system constraints 341 and 342, respectively, an immediate engine torque command 343, a predicted engine torque command 344, and an engine air torque 345. The immediate engine torque command 343 represents a present command for controlling engine operation, and reflects actual engine torque throughout the operating period depicted in FIG. 3. The predicted engine torque command 344 represents a long-range command for controlling engine operation, and represents a maximum engine torque capacity when operating the engine at a MBT-spark advance. The predicted engine torque command 344 is achieved by commanding operating states for slow engine actuators, e.g., throttle/mass air control or fuel mass control responsive to the engine torque command. The engine air torque 345 is responsive to the predicted engine torque command 344, and represents an estimated instantaneous maximum engine torque, i.e., the maximum engine torque at the current amount of air per cylinder at the present fueling rate. The engine achieves a torque equivalent to the engine air torque when the air/fuel ratio is stoichiometric and the spark timing is set at a knock-limited MBT spark timing. The immediate engine torque command 343 represents a short-range engine torque command that employs fast engine actuators, e.g., spark timing control or fuel injection timing control, and the slow engine actuators to control engine torque output responsive to the torque command. The immediate engine torque command 343 is responsive to an engine-based output torque range that is dictated by the minimum and maximum engine torque system constraints 341, 342. The engine torque constraints are responsive to the minimum and maximum motor X torque capacities 322 and 324, the output torque request, and other factors. The time-coincident parameters include an engine torque response type 350, including an inactive engine response 352 and an active engine response 354. The aforementioned parameters are all plotted in relation to time 310. The inactive engine response 352 includes commands to control engine operation responsive to an engine torque request employing the predicted engine torque command 344 and the slow engine actuators. The active engine response 354 includes commands to control engine operation responsive to an engine torque request employing the immediate engine torque command 343 and both the fast engine actuators and the slow engine actuators.

Prior to time 301, the powertrain system is operating with tractive torque contributions from the engine and the one of the torque machines referred to as motor X. At time 301, motor X is disabled, e.g., in response to a command to operate in an electric-neutral state, resulting in an immediate reduction in the minimum and maximum motor X torque capacities 322 and 324, including one of the minimum and maximum motor X torque capacities 322 and 324 set equal to the present motor X torque command 326. The command to operate in the electric-neutral state also results in the engine torque response type 350 transitioning from the inactive engine response state 352 to the pleasibility-limited engine response 354, with corresponding changes in the minimum and maximum engine torque system constraints 341, 342. This includes setting the maximum engine torque system constraint 342 equal to the previous immediate engine torque command 343. The response state may switch frequently during torque ramp-down and torque ramp-up periods, with the response type set to the active state, i.e., the pleasibility-limited engine response 354 if doing so is needed to achieve a fast torque change through control of the spark advance. Operation in the pleasibility-limited engine response 354 is preferably minimized since such operation may affect fuel efficiency.

During the period between times 301 and 302, the minimum and maximum engine torque system constraints 341, 342 converge to the immediate engine torque command 343, and the minimum and maximum motor X torque capacities 322, 324, converge to the motor X torque command 326, which is ramped down to zero torque at time 302. As shown, the engine torque is unchanged for a brief period of time after time 301 and then ramps down in response to the dynamic aspect of the motor X speed control torque correction request 330 and the motor torque command 326. While the minimum motor X torque capacity 322 ramps toward zero, the motor X speed control torque request 330 initially moves in the same direction, i.e., increases, thus no change in engine torque is initially required.

The predicted engine torque command 344 is controlled to provide a reserve torque by maintaining the engine air torque 345 at a magnitude that is greater than the immediate engine torque command 343. Thus the engine air torque 345 is controlled responsive to the predicted engine torque command 344, and the immediate engine torque command 343 is achieved by controlling spark advance away from the MBT-spark point to allow for an engine torque reserve.

The motor X torque command 326 is set to zero at time 302, and maintained thereat during operation with motor X in the disabled state, which ends at time 303. The motor X speed control torque correction request 330 varies at a much lower frequency when there is no additional motor torque capacity available, i.e., when the motor X torque command equals the torque limit. The lower frequency speed control torque correction request is achieved through software which applies smaller speed control torque correction gains when the engine is the actuator performing speed control to accommodate the slower responsiveness of the engine as compared to the responsiveness of the torque machines. The engine air torque 345 is controlled responsive to the predicted engine torque command 344, and the immediate engine torque command 343 is controlled responsive to the minimum and maximum engine torque system constraints 341, 342, which have converged.

During operation with motor X in the disabled state, the minimum and maximum motor X torque capacities 322 and 324 are maintained at zero, and speed control is achieved through the immediate engine torque command 343, with a speed control reserve maintained through the predicted engine torque command 344.

In response to a command to exit from the disabled motor state, the minimum and maximum motor X torque capacities 322 and 324 are ramped back to normal motor torque limits. This is shown starting at time 303 and ending at time 304. Correspondingly, the minimum and maximum engine torque system constraints 341 and 342 separate. Operation with motor X generating torque is achieved before the engine commands transition from the pleasibility-limited engine response 354 with spark control to the inactive engine response 352 with the engine operating at MBT-spark responsive to the engine air torque 345.

The control scheme 200 operates to effect smooth transitions in the engine response during transitions in and out of a disabled motor state since engine torque control is maintained throughout the transitions, with the engine employed as the main torque actuator to control input speed during disabled motor operation, such as occurs with operation in the Neutral 1/ETC range. This operation avoids the lack of control of the input speed using the torque machines under such operating conditions.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system including a multi-mode transmission configured to transfer torque among an engine, torque machines, and an output member in one of a plurality of transmission ranges, the method comprising:
in response to a command to disable one of the torque machines, converging minimum and maximum torque capacities of the one of the torque machines to zero and converging minimum and maximum engine torque system constraints to a single engine torque command in response to the minimum and maximum torque capacity limits of the one of the torque machines and an output torque request; and
controlling torque output from the engine including employing a fast engine actuator to control the engine in response to the output torque request, and maintaining torque output from the one of the torque machines at zero.

2. The method of claim 1, wherein controlling torque output from the engine including employing the fast engine actuator comprises controlling the engine at a spark advance that differs from MBT-spark advance when the engine is configured as a spark-ignition internal combustion engine.

3. The method of claim 1, wherein controlling torque output from the engine including employing the fast engine actuator comprises controlling the engine at a fuel injection timing that differs from an optimal fuel injection timing when the engine is configured as a compression-ignition internal combustion engine.

4. The method of claim 1, wherein the command to disable one of the torque machines comprises a command to operate the transmission in a neutral range.

5. The method of claim 1, wherein the command to disable one of the torque machines comprises a command to reduce torque output from the torque machine to zero torque output.

6. The method of claim 1, wherein controlling torque output from the engine including employing the fast engine actuator comprises maintaining a speed control reserve by controlling a slow engine actuator in response to a maximum engine torque capacity when operating the engine at MBT-spark advance.

7. A method for operating a powertrain system including a multi-mode transmission configured to transfer torque among an engine, a torque machine configured to generate tractive torque and an output member, the method comprising:
in response to a command to generate a derated torque output from the torque machine, converging minimum and maximum torque capacities of the torque machine to the derated torque output; and
controlling engine operation in response to the minimum and maximum torque capacity limits of the torque machine and an output torque request, and maintaining torque output from the torque machine at the derated torque output.

8. The method of claim 7, wherein controlling the engine operation in response to the output torque request comprises controlling torque output from the engine including employing a fast engine actuator to control the engine in response to the output torque request.

9. The method of claim 8, wherein controlling the engine operation in response to the output torque request comprises controlling the engine at a spark advance that differs from MBT-spark advance when the engine is configured as a spark-ignition internal combustion engine.

10. The method of claim 9, further comprising maintaining a speed control reserve by controlling a slow engine actuator in response to a maximum engine torque capacity when operating the engine at MBT-spark advance.

11. The method of claim 8, wherein controlling torque output from the engine including employing the fast engine actuator to control the engine in response to the output torque request comprises controlling the engine at a fuel injection timing that differs from an optimal fuel injection timing when the engine is configured as a compression-ignition internal combustion engine.

12. A method for operating a powertrain system including a multi-mode transmission configured to transfer torque among an engine, torque machines, and an output member in one of a plurality of transmission ranges, the method comprising:

in response to a command to reduce torque output from one of the torque machines configured to generate tractive torque, converging minimum and maximum torque capacities of the one of the torque machines to a preferred state and converging minimum and maximum engine torque system constraints to a single engine torque command in response to the minimum and maximum torque capacities of the one of the torque machines and an output torque request; and controlling torque output from the engine including employing a fast engine actuator to control the engine in response to the output torque request.

13. The method of claim 12, wherein the command to reduce torque output from one of the torque machines configured to generate tractive torque is in response to a derated torque capacity of the torque machine.

14. The method of claim 12, wherein converging minimum and maximum torque capacities of the one of the torque machines to the preferred state comprises converging minimum and maximum torque capacities of the one of the torque machines in response to the derated torque capacity of the torque machine.

15. The method of claim 12, wherein controlling torque output from the engine including employing the fast engine actuator comprises controlling the engine at a spark advance that differs from MBT-spark advance when the engine is configured as a spark-ignition internal combustion engine.

16. The method of claim 15, further comprising maintaining a speed control reserve by controlling a slow engine actuator in response to a maximum engine torque capacity when operating the engine at MBT-spark advance.

* * * * *